(12) United States Patent
Shepherd et al.

(10) Patent No.: US 8,576,450 B2
(45) Date of Patent: Nov. 5, 2013

(54) REPLACING A DEFECTIVE COLORANT (75) Inventors: Matthew A Shepherd, Vancouver, WA (US); Vanessa Verzwyvelt, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 13/167,072

(22) Filed: Jun. 23, 2011

(65) Prior Publication Data

US 2012/0327478 A1 Dec. 27, 2012

(51) Int. Cl.
*G06K 15/00* (2006.01)

(52) U.S. Cl.
USPC .......... 358/3.06; 358/1.9; 358/504; 358/518; 347/19

(58) Field of Classification Search
None
See application file for complete search history.

(56) References Cited

U.S. PATENT DOCUMENTS

| | | | |
|---|---|---|---|
| 5,870,530 A | 2/1999 | Balasubramanian | |
| 6,377,366 B1 | 4/2002 | Usami | |
| 6,695,435 B1 | 2/2004 | Cheng et al. | |
| 6,722,751 B2 * | 4/2004 | Barr et al. | 347/19 |
| 7,252,359 B2 * | 8/2007 | Udagawa | 347/19 |
| 7,316,464 B2 * | 1/2008 | Shibata et al. | 347/14 |
| 7,591,525 B2 * | 9/2009 | Arazaki | 347/19 |
| 7,673,958 B2 * | 3/2010 | Heiles et al. | 347/19 |
| 8,511,788 B2 * | 8/2013 | Inoue | 347/19 |
| 2003/0179410 A1 * | 9/2003 | Velde | 358/3.03 |
| 2005/0259296 A1 * | 11/2005 | Faken et al. | 358/3.04 |
| 2006/0181565 A1 * | 8/2006 | Arazaki | 347/19 |
| 2006/0284916 A1 * | 12/2006 | Heiles et al. | 347/19 |

* cited by examiner

*Primary Examiner* — Dung Tran (57) ABSTRACT

A system and methods for modifying the values of halftoned image pixels to replace a defective colorant with at least one non-defective colorant.

22 Claims, 7 Drawing Sheets

| K TO C | |
|---|---|
| DISTANCE | COUNTS |
| 1 | 280 |
| 2 | 240 |
| 4 | 220 |
| 8 | 210 |
| 16 | 205 |
| 32 | 202 |

~72

| K TO M | |
|---|---|
| DISTANCE | COUNTS |
| 1 | 190 |
| 2 | 160 |
| 4 | 145 |
| 8 | 137 |
| 16 | 133 |
| 32 | 131 |

~74

| K TO Y | |
|---|---|
| DISTANCE | COUNTS |
| 1 | 210 |
| 2 | 180 |
| 4 | 165 |
| 8 | 157 |
| 16 | 153 |
| 32 | 151 |

| | P1 | P2 | P3 | P4 | P5 | P6 | P7 | P8 | P9 | P10 | P11 | P12 | P13 | P14 | P15 | P16 |
|---|----|----|----|----|----|----|----|----|----|-----|-----|-----|-----|-----|-----|-----|
| 80 | CY | K | KM | - | - | K | K | - | K | - | - | - | - | - | K | - |
| 82 | CY | CMY | CM | - | - | CMY | CMY | - | CY | - | - | - | - | - | CM | - |

{ 84

| | P17 | P18 | P19 | P20 | P21 | P22 | P23 | P24 | P25 | P26 | P27 | P28 | P29 | P30 | P31 | P32 |
|---|-----|-----|-----|-----|-----|-----|-----|-----|-----|-----|-----|-----|-----|-----|-----|-----|
| 80 | - | - | - | - | KCY | KMY | - | Y | - | - | - | K | - | - | - | - |
| 82 | - | - | - | - | CY | CMY | CMY | CMY | - | - | - | M | - | - | - | - |

REPLACING A DEFECTIVE COLORANT

BACKGROUND

Many image-forming apparatuses generate images from a corresponding set of pixels representing a digital color image. Such devices include printers that form images on a hardcopy media, displays that produce an image on a display screen, and projectors that project a digital image onto a surface, among many others. Each pixel has a value that specifies the color of the pixel—such as, for example, its hue, saturation, and lightness—in a color space. These devices typically use a plurality of different color colorants, such as a colored fluid or ink, or a colored light, to generate the desired color when rendering the image.

However, a portion of an image-forming device may become defective such that it is unable to generate the desired color for all of the pixels. For example, a component that produces a particular colorant may become defective. In a display or a projector that uses DLP technology, for example, a micro-mirror associated with a particular colorant may not operate properly. Similar effects can occur in other types of pixel-addressable displays, such as those used in televisions, digital cameras, cell phones, and the like.

Print mechanisms are widely used in a variety of products, such as printers, plotters, copiers, cameras, facsimile machines, and all-in-one devices (e.g. a combination of at least two of a printer, scanner, copier, and fax), to name a few. In a print mechanism, such as for example a mechanism that uses inkjet technology to generate a hardcopy print on a print medium, a defective print element for a particular colorant can emit drops that have a drop weight (which corresponds to the amount of the colorant) that is higher or lower than an acceptable range for producing high quality printed images. In some cases, the print element may fail to emit any drops at all.

When a defective component is used to print a raster, pixels in the raster that utilize the colorant that corresponds to the defective component can display an incorrect color. Often the difference in color is visible to the human eye at a normal viewing distance, which undesirably degrades the quality of the rendered image and can result in the image forming device being repaired or replaced, incurring increased cost and loss of time.

DETAILED DESCRIPTION

Referring now to the drawings, there are illustrated examples of methods of forming an image using a plurality of device-dependent colorants and an image forming apparatus. A defective colorant is a colorant that corresponds to a defective colorant-generating component. The methods and apparatus modify the values of pixels in a raster associated with a defective colorant to generate new values which result in the raster being rendered by one or more non-defective colorants in such a manner as to appear substantially equivalent in color to the human eye at a normal viewing distance. The amount(s) of the non-defective colorant(s) used to replace the defective colorant for a pixel may be determined according to a predetermined non-linear relationship based on a local density of the defective colorant at the pixel. The replacement may be performed by converting the halftoned pixel values to a count space for each non-defective colorant, and then re-halftoning the counts in order to generate the new pixel values that do not use the defective colorant.

Figure 1:
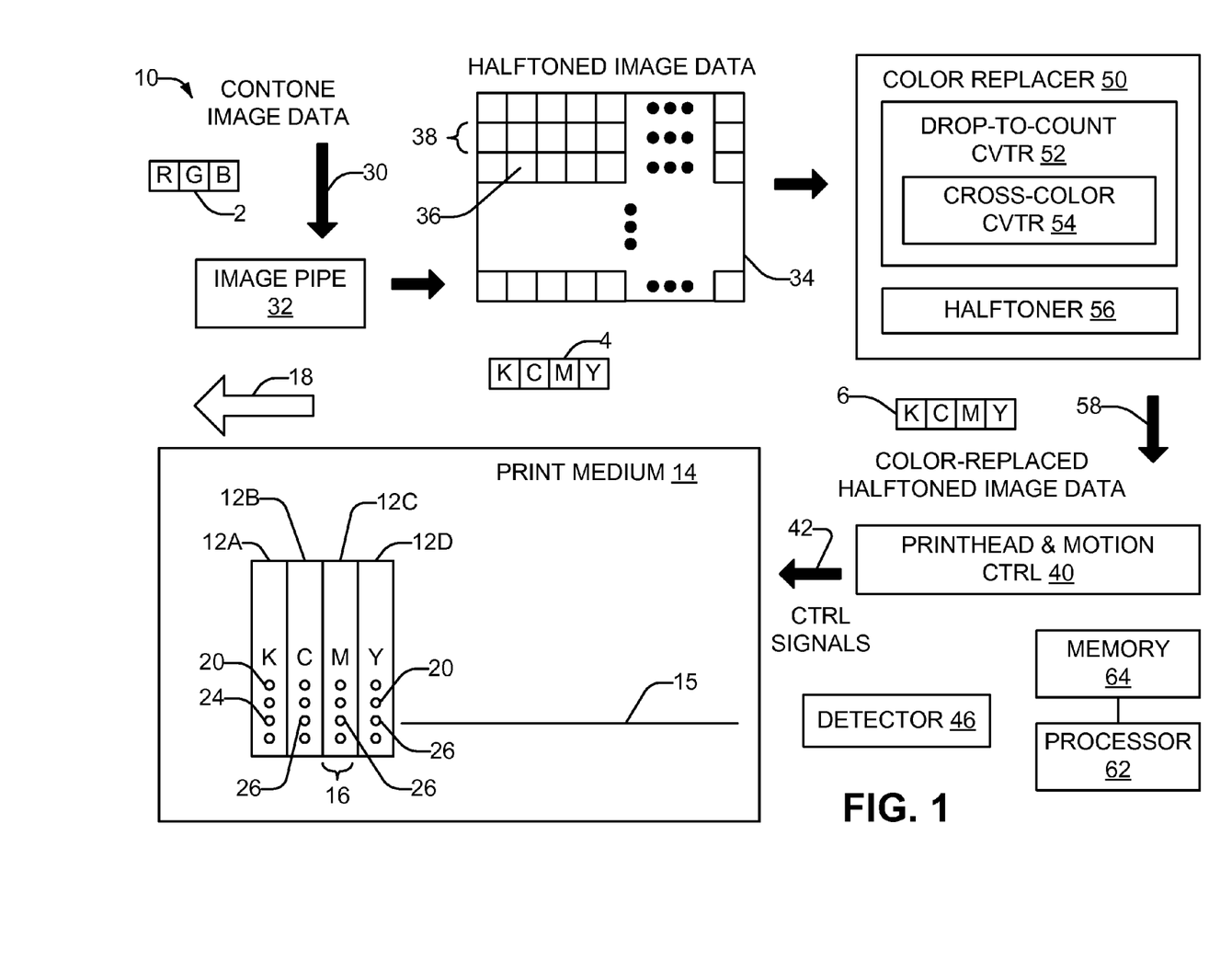
FIG. 1 is a schematic representation of a printing system according to an embodiment of the present disclosure.

Considering now one example system for printing color image data using a plurality of colorants, and with further reference to FIG. 1, a printing system 10 typically performs at least one data conversion operation that converts image data in one color space format into image data in another color format. Image data may begin as "contone" (continuous-tone) data, typically represented in a device-independent color space format. One such format is RGB. An individual pixel having data in an RGB format 2 has red (R), green (G), and blue (B) component values. For contone data, each of the component values has a relatively larger range of values. For example, each component value may be an eight bit value that supports 256 different tonal values for that colorant. When the various combinations of R, G, and B components of a pixel are considered as a whole, it can be appreciated that contone pixel values can encompass a wide range of color values, with sufficient resolution to provide a substantially continuous range of tonal values.

Another image data format is halftoned image data represented in a device-dependent color space format. One such format is KCMY. An individual pixel having data in a KCMY format 4 has black (K), cyan (C), magenta (M), and (Y) component values. Each component corresponds to one of the colorants generated by the printing system. Printing system 10 has K, C, M, and Y colorants. Other colorant sets may add to these a light cyan and a light magenta for a total of six colorants. Others may add different shades of gray. Other colorant sets may use substantially different colorants. Regardless of the particular colorants in a set, they collectively allow a range of colors corresponding to the pixel values to be printed on the print medium.

For halftoned data, each of the component values typically has a relatively smaller range of values. In printing system 10, the colorants are liquids such as, for example, ink. As defined herein and in the appended claims, a "liquid" shall be broadly understood to mean a fluid not composed primarily of a gas or gases. Each of the component values of a halftoned pixel 4 specify directly or indirectly how much (e.g. how many drops) of the corresponding colorant is to be deposited in order to properly print the pixel. As such, a component value of the halftoned pixel 4 may be considered the drop value of the colorant associated with that component. The printing system 10 can deposit, for a pixel, an integer number of drops. The range of numbers of drops is typically limited to a relatively small set of drop levels. For example, the set may have two drop levels: either no drops of the colorant will be deposited, or N drops (usually one drop). Other sets may have more drop levels; for example, four drop levels, sixteen drop levels, etc. As a result, the component value of each colorant can be represented using a small number of binary bits; for example, one bit for two levels, or four bits for sixteen levels. Compared to the range of component values of the contone data, however, the range of component values of the halftoned data is relatively smaller. As such, the component values of the halftoned pixel data are considered to have discrete values for the amounts of the corresponding colorant.

The printing system 10 includes a plurality of print elements 20 each configured to emit drops of one of the colorants to print halftoned pixels of a raster of the data. Printing system 10 includes a K printhead 12A, a C printhead 12B, an M printhead 12C, and a Y printhead 12D. Each printhead 12 has a plurality of print elements 20 for controllably emitting drops of colorant of the corresponding color. Typically these print elements are arranged logically and/or physically in a linear array, such as array 16 for M colorant, with the print elements substantially equally spaced along the array. To print an image, drops of the appropriate color colorants are emitted from the print elements 20 and deposited onto locations of a print medium 14 in a pattern that corresponds to the image. The printheads 12, print medium 14, or both may be moved during the printing process so as to properly deposit the drops at the desired locations on the medium 14. The medium 14 may be any type of suitable sheet or roll material, such as paper, card stock, cloth or other fabric, transparencies, mylar, and the like.

The image data to be printed is typically provided to the printing system 10 as contone data 30. An image pipe 32 converts the contone image data 30 into halftoned image data 34. In general, the conversion includes a color conversion operation that transforms the pixels from the device-independent color space (e.g. RGB) to the device-dependent color space (e.g. KCMY) that corresponds to the colorants of the printing system 10. In addition, the conversion also includes a halftoning operation that converts the higher-resolution continuous-tone data into lower-resolution halftone data that corresponds to the discrete set of drop levels for each colorant. The halftoned image data 34 is logically organized as a row-and-column arrangement of halftoned image pixels 36. Each halftoned image pixel 36 has a pixel value in the KCMY format 4.

If the print elements associated with a particular raster, such as a raster 38, of the halftoned image data 34 are operating properly (i.e. non-defective) for all of the colorants, the halftoned image data 34 for the raster 38 can be properly printed on the print medium 14 by the printheads 12. In this case, the halftoned image data 34 is provided to a printhead and motion controller 40, which issues control signals 42 to position the printheads 12 and/or the medium 14, and to control the various print elements 20 to eject drops of the various colorants to print the various pixels 36 of the halftoned image data 34 at the proper location on the medium 14.

The printing system 10 includes a print quality detector 46 that can identify whether specific print elements 20 are operating properly (i.e. non-defective) or are defective. One example detector 46 may include a light sensor such as a photo diode which senses the light provided by a light source such as an LED. When a colorant drop is present in the light path between the light sensor and the light source, the output of the light sensor changes since the amount of light sensed by the light sensor is reduced by the presence of the colorant drop. The output of the light sensor may be amplified and analyzed to determine whether a drop passed through the light path between the light source and the light sensor. Another example detector 46 has an optically reflective detector that can be positioned adjacent the print medium 14 to optically determine the presence of an ink drop on the medium 14. Other types of detectors 46 include an acoustical drop detector, a light-scatter drop detector, or an electrostatic in-flight sensor.

Assume for purposes of illustration that printing system 10 includes a defective print element 24 in the K printhead 12A, and that the printheads 12 and/or the medium 14 are moved in a direction 18 such that defective print element 24 is intended to print line 15 on the print medium 14. Although print element 24 is defective, print elements 26 can properly deposit drops of C, M, and Y colorant on the line 15. In addition, assume that print elements 24, 26 are associated with the pixels of raster 38, such that print elements 24, 26 are intended to be used to print these pixels.

As explained previously, any pixels 36 of raster 38 of the halftoned image data 34 that have a pixel value in which the K component specifies the deposition of drops on line 15 would be printed in a different manner from what is intended, because K print element 24 is defective. To avoid the degradation in print quality that would otherwise result, the halftoned pixels 36 of raster 38 are processed by a color replacer 50 prior to printing in order to modify the pixel values. The color replacer 50 modifies the K, C, M, and/or Y component values of the pixels to replace the colorant of the defective print element with an added amount of colorant from one or more of the non-defective print elements. In this example, since the defective print element is for the K colorant, the K colorant will be replaced by the C, M, and Y colorants. Among other examples, non-defective K colorant may be used to replace defective C colorant, non-defective K colorant may be used to replace defective M colorant, non-defective M colorant may be used to replace defective C colorant, or non-defective C colorant may be used to replace defective M colorant.

To replace the K colorant of defective print element 24, the color replacer 50 will increase the C, M, and Y component values of some of the pixels 36 in raster 38, and set the K component value for all of the pixels 36 in raster 38 to zero. The added amount of the non-defective colorant(s) is determined, for each individual pixel that has a non-zero component value for the defective print element (e.g. K), from a local density of the colorant of the defective print element at the location of the individual pixel, according to a predetermined non-linear relationship.

The pixels 36 of the raster 38 are processed by the color replacer 50 in a sequential, pixel-by-pixel manner. During replacement, each pixel is processed, in turn, by a drop-to-count converter 52 and a halftoner 56. The drop-to-count converter 52 converts halftoned pixel values (i.e. drop values) into counts in a count space. "Total count" values in the count space serve as a "bank account" for each colorant. In addition, the total count values for the non-defective colorant(s) are increased as the defective pixel component is replaced by amounts of the non-defective colorant(s). The halftoner 56 operates to convert the total count values back into drop levels of the non-defective colorants for the modified pixel. After processing of a raster 38 by the color replacer 50 has been completed, color-replaced halftoned image data 58 is generated that has a zero component value for the defective colorant for all the pixels of the raster. The format 6 of the modified pixels of the color-replaced halftoned image data 58 is the same as the format 4 of the halftoned image data 34. The modified pixels of the color-replaced halftoned image data 58, when printed on line 15 of the medium 14 by non-defective print elements 26, will produce output that appears substantially equivalent to the halftoned image data 34 when viewed by the human eye at a normal viewing distance. Each pixel of the color-replaced halftoned image data 58 can be printed with the printing system 10 by emitting the number of drops corresponding to the new value of each of the non-defective colorants of that pixel onto the print medium 14 at the location which corresponds to that pixel.

The drop-to-count converter 52 generates total counts for all of the pixel components which correspond to non-defective print elements. Since K colorant is defective in the example printing system 10, the drop-to-count converter 52 generates total counts for the C, M, and Y pixel components. The drop-to-count transformation is direct for non-defective colorants, with one drop corresponding to N counts such as, for example, 256 counts. The drop-to-count transformation from a defective colorant to counts for one or more non-defective colorants is performed by cross-color converter 54. Cross-color converter 54 determines the added amount of the non-defective colorant(s) for each individual pixel, according to a predetermined non-linear relationship, from a local density at the individual pixel of the colorant of the defective print element. The local density may be derived based on a distance in the raster of the pixel from a last prior pixel for which defective colorant has been replaced by non-defective colorant(s). The operation of the cross-color converter 54 and of the entire color replacer 50 will be discussed subsequently in greater detail with reference to FIGS. 2-4.

Some printing systems include a computer and a printer. The contone image data 30 may be generated by the computer. The image pipeline 32 may be disposed in the computer, in the printer, or partially in both. Similarly, the color replacer 50 may be disposed in the computer, in the printer, or partially in both. The image pipeline 32 and the color replacer 50 may be implemented in software such as a printer driver in the computer, by firmware in the printer, by hardware in the printer, or by a combination of these. The printing system 10 includes at least one processor 62, coupled to at least one memory 64, that can be configured to execute the software and/or firmware instructions for the image pipeline 32 and/or the color replacer 50. The processor 62 may also execute instructions in the memory 64 to control other components or subsystems, including but not limited to the printhead and motion controller 40 and the detector 46.

While the formation of color-replaced halftoned image data has been described with reference to FIG. 1 in the context of an example printing system, the technique is applicable to image-forming devices in general. In this regard, consider now one example method of forming an image using a plurality of device-dependent colorants. With regard to the printing system 10 of FIG. 1, the method may alternatively be considered as a flowchart of the color replacer 50.

Figure 2:
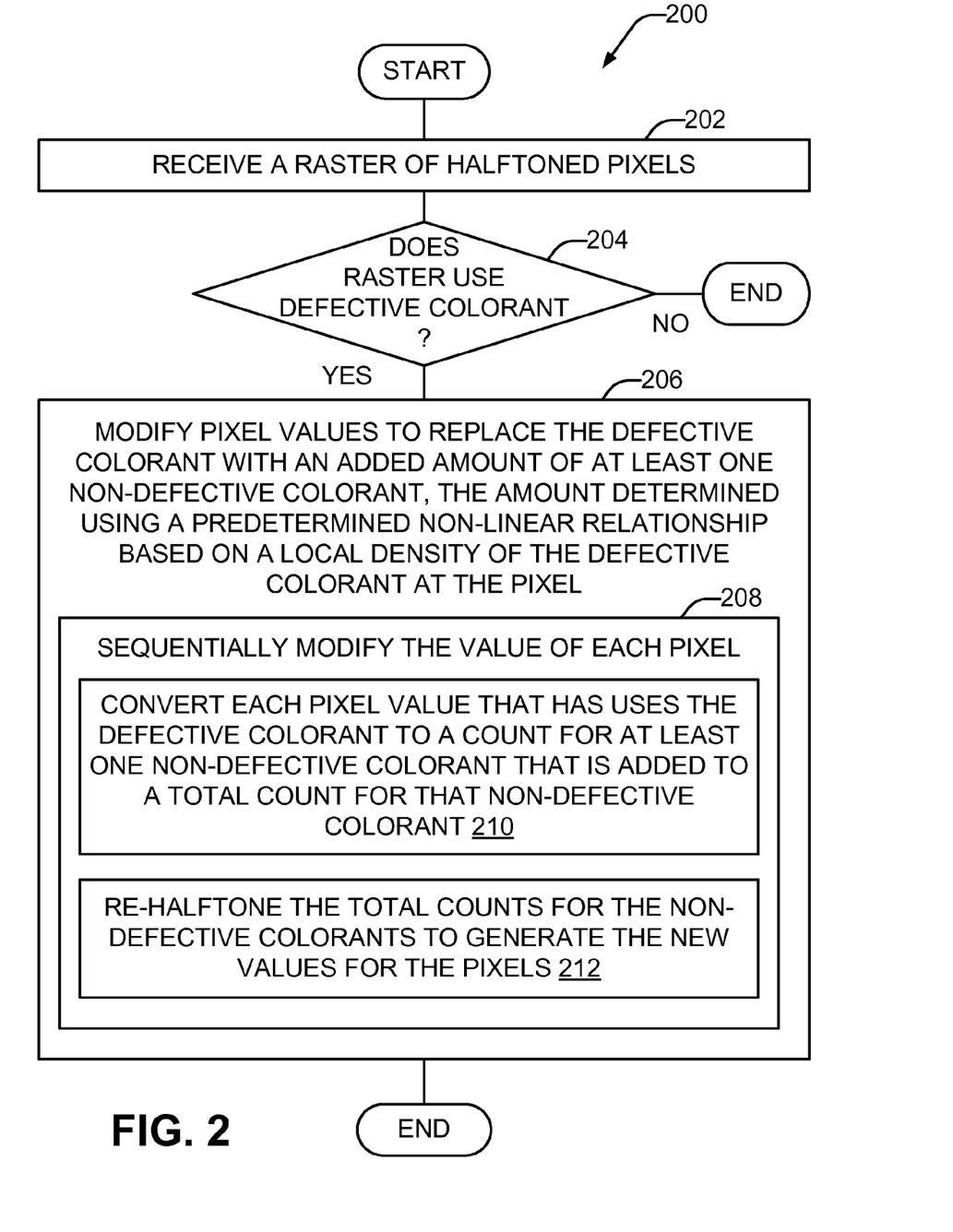
FIG. 2 is a flowchart in accordance with an embodiment of the present disclosure of a method of forming an image using a plurality of device-dependent colorants usable with, among other apparatuses, the printing system of FIG. 1.

In a method 200, and with further reference to FIG. 2, at 202 at least one raster of halftoned image pixels each having a discrete value for each of the colorants is received. At 204, it is determined whether the raster is associated with a defective colorant. The determination may include determining whether a defective colorant exists and, if so, whether the pixels of the raster are intended to be printed with the defective colorant. If the pixels of the raster are intended to be printed with the defective colorant ("Yes" branch of 204), then as 206 the values of the pixels are modified to replace the defective colorant with an added amount of at least one non-defective colorant, the amount for each individual pixel determined according to a predetermined non-linear relationship from a local density of the defective colorant at the corresponding pixel. In some examples, the value of the pixels in the raster are sequentially modified at 208. For an individual pixel, the modification includes, at 210, converting the value of each pixel that has a non-zero value for the defective colorant to a count for at least one of the non-defective colorants that is added to a total count for that non-defective colorant. The modification also includes, at 212, re-halftoning the total counts for the non-defective colorants to generate the new one of the N discrete values for the pixels.

Figure 4:
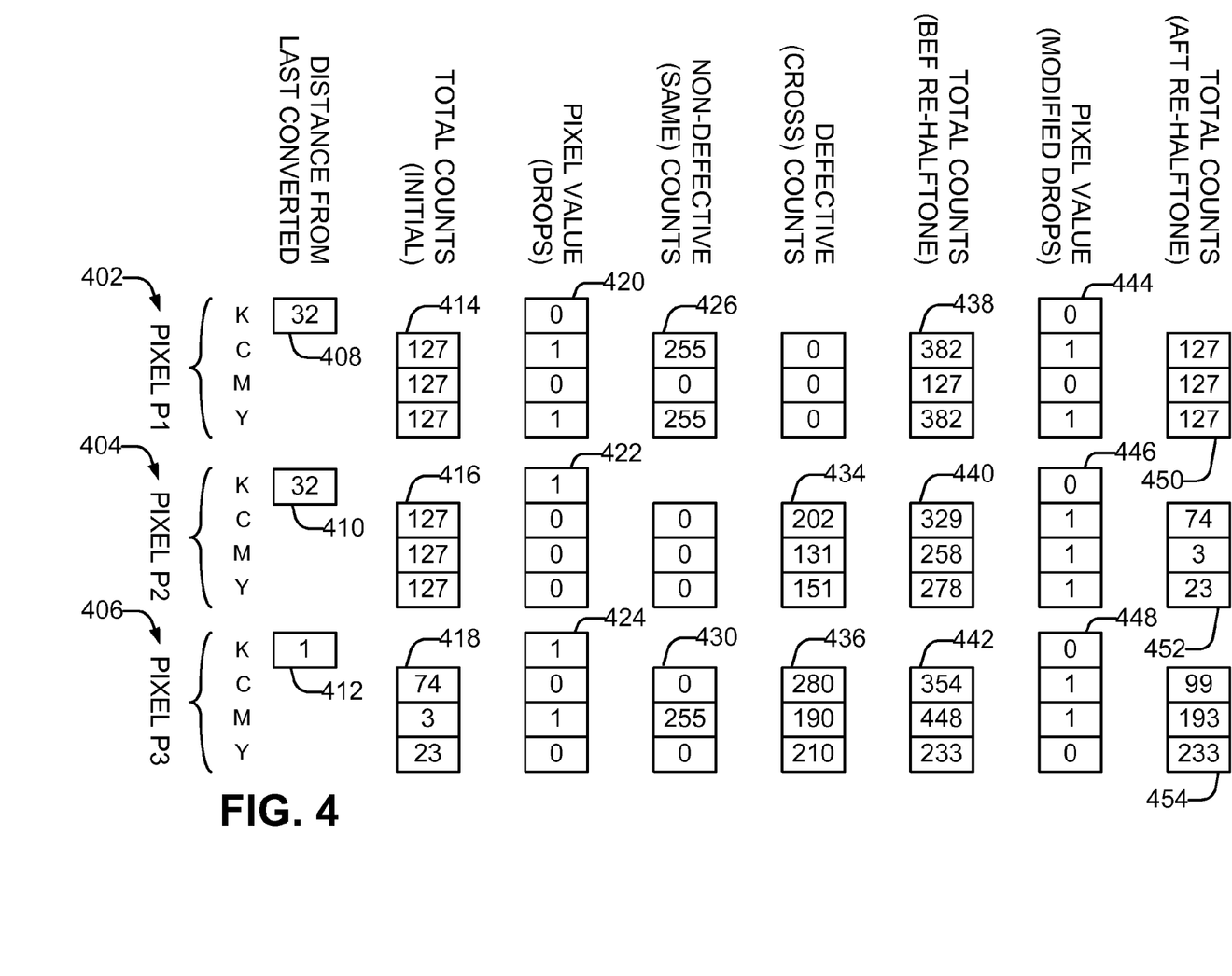
FIG. 4 is a working example of processing a raster of example pixel data to replace a defective colorant with non-defective colorants in a human-vision-equivalent manner using the flowcharts of FIG. 2 or 3A-B in accordance with an embodiment of the present disclosure.

The operation of the method 200 can be further appreciated with regard to the subsequent discussion with reference to FIG. 4.

Figure 3A:
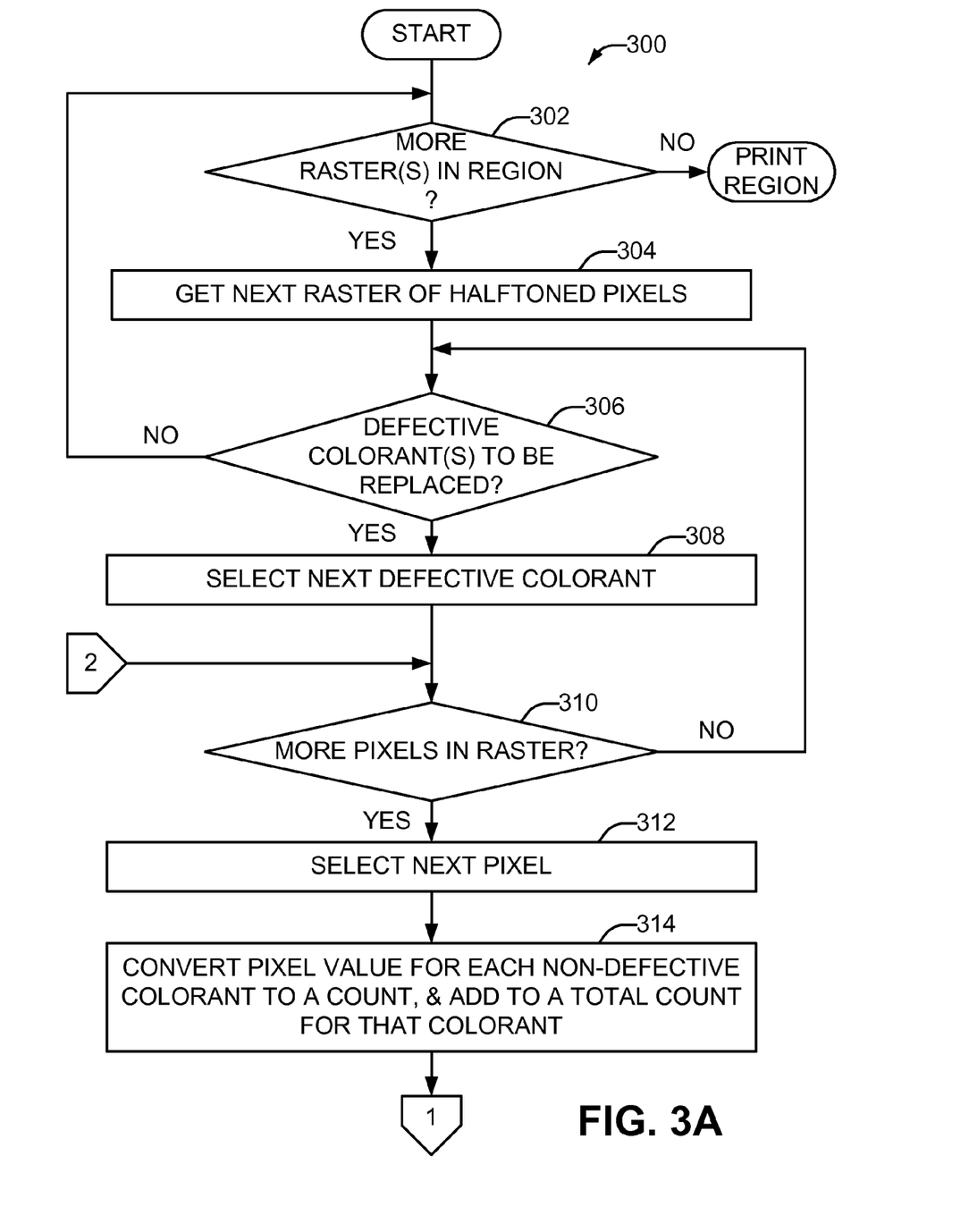
FIGS. 3A-B are flowcharts in accordance with an embodiment of the present disclosure of another method of forming an image using a plurality of device-dependent colorants usable with, among other apparatuses, the printing system of FIG. 1.
Figure 3B:
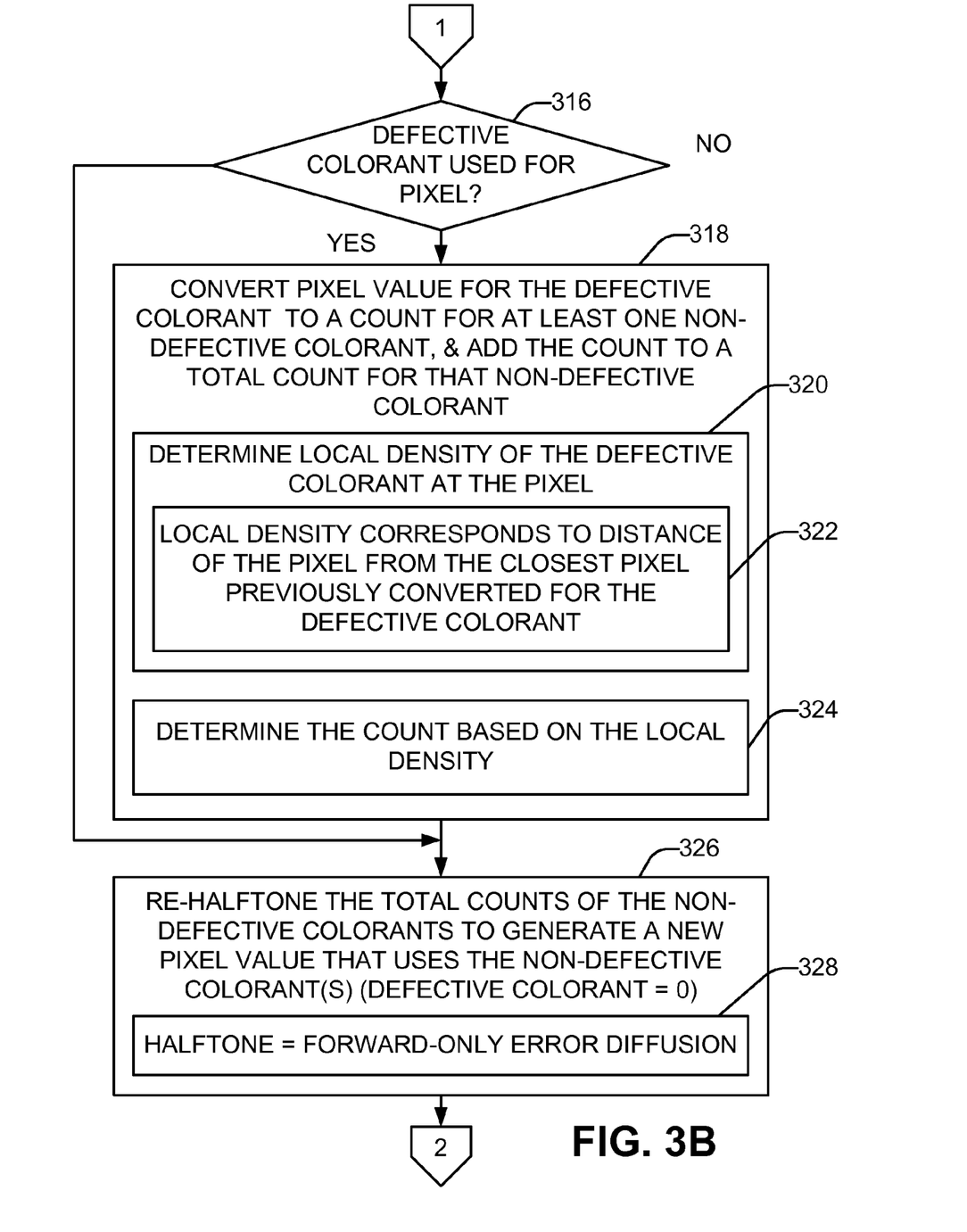

Considering now in further detail another example method 300 of forming an image using a plurality of device-dependent colorants, and with reference to FIGS. 3A and 3B, at 302 it is determined whether there are rasters of halftoned pixels remaining to be printed. If so, ("Yes" branch of 302), then at 304 the next raster of halftoned pixels is obtained. At 306, it is determined whether there is at least one defective colorant associated with the raster such that the pixels of the raster would be printed with the defective colorant. If not, ("No" branch of 306), the method branches to 302. If so, ("Yes" branch of 306), then at 308 one of the defective colorants is selected so that the values of the pixels of the raster can be transformed to produce a human-vision-equivalent raster without using the defective colorant. At 310, it is determined whether there are more pixels to be processed in the raster. If not, ("No" branch of 310), the method branches to 306. If so, ("Yes" branch of 310), then at 312 the next pixel to be processed is selected. At 314 the component value for each non-defective colorant is converted to a count, and the count is added to a total count for that non-defective colorant. At 316, it is determined whether the current pixel uses the defective colorant; in other words, whether the pixel component value corresponding to the defective colorant specifies that an amount of the colorant be used to render the pixel. Typically, a non-zero component value indicates that an amount of the colorant is to be used. If not, ("No" branch of 316), the method branches to 326. If so, ("Yes" branch of 316), then at 318 the component value for the defective colorant is converted to a second count for at least one of the non-defective colorants, and the second count is added to the total count for that non-defective colorant. A local density of the defective colorant in the original (unmodified) raster data at the location of the pixel may be determined at 320, and the second count may be determined based on the local density at 324. The local density may, at 322, correspond to a distance of the pixel from a closest prior pixel in the raster for which the value of the defective colorant was previously converted. At 326, the total counts of the non-defective colorants may be re-halftoned to generate a new pixel value that uses the non-defective colorants. The component values for the non-defective colorants specify the proper amount of the colorant used to print the modified pixel, while the component value for the defective colorant has a value of zero such that the defective colorant will not be used to print the modified pixel. The re-halftoning may be, at 328, forward-only error diffusion. In other examples, different re-halftoning techniques may be used.

With regard to the printing system 10 of FIG. 1, the method 300 may alternatively be considered as a flowchart of the color replacer 50.

Considering now a working example of the operation of the method 200 and method 300, and with reference to FIG. 4, several assumptions for the working example that assist in illustrating its operation are explained as follows. The halftoned image data comprises K, C, M, and Y components. The defective colorant is K, and it will be replaced by C, M, and Y. A component value has two drop levels. A value of zero indicates that no drops of the corresponding colorant will be deposited, while a value of one indicates that one drop of the corresponding colorant will be deposited. For a non-defective colorant, one drop will be converted to a value of 255 counts. Processing of a raster will start at the leftmost pixel and proceed to the right (although it could alternatively start at the rightmost pixel and proceed to the left). At the start of a raster, the total counts 414 for the colorants are each initialized to a value of 127, which is one-half of a pixel on 0 to 255 range. Also, at the start of a raster, the distance 408 of the first pixel 402 from the closest prior pixel in the raster for which the value of the defective colorant was previously converted is set to a value which corresponds to the largest distance, which corresponds to the lowest local density of concern. In this example, the value of distance 408 is 32, the use of which will be explained subsequently in more detail.

FIG. 4 illustrates the first three halftoned image pixels 402-406 in the raster. Pixel P1 402 has K, C, M, and Y component values 420; pixel P2 404, values 422; and pixel P3 406, values 424.

Processing begins with pixel P1 402. Pixel value 420 specifies zero drops of K colorant, one drop of C colorant, zero drops of M colorant and one drop of Y colorant. The value 420 is converted to 255 counts of C colorant, 0 counts of M colorant, and 255 counts of Y colorant, at 426. Adding each of the counts 426 for a colorant to its corresponding initial total count 414 results in total count values 438 (before re-halftoning) of 382, 127, and 382 for C, M, and Y respectively. The re-halftoning operation evaluates the total count values 438 for each of the colorants versus a threshold in order to convert counts back to drops for the pixel. If the total count for a colorant is above the threshold, the colorant value of the modified pixel will be set to at least one drop. Due to the assumptions used in this simplified working example, the threshold value is 255 and a maximum of one drop will be generated. However, in other examples in which a component value has more than two allowable drop levels, more than one drop may be generated.

The total count value 438 for the C colorant equals 382, which exceeds the threshold value of 255. Therefore, the pixel value 444 is set to one drop for the C colorant. The threshold value of 255 is subtracted from the total count value 438 to produce the total counts value 450 for the C colorant after re-halftoning of 127. Performing this operation for the M colorant results in zero drops of M colorant in the pixel value 444, and a total count value 450 (after re-halftoning) for the M colorant of 127. Similarly to the C colorant, performing this operation for the Y colorant results in one drops of Y colorant in the pixel value 444, and a total count value 450 (after re-halftoning) for the Y colorant of 127. Thus, it can be observed that, for situations in which there is no cross-color replacement of the defective K colorant with CMY colorants, the initial pixel value 420 and the modified pixel value 444 are identical.

Next, consider the processing of pixel P2 404. Pixel value 422 specifies one drop of K colorant, and zero drops of C, M, and Y colorants. Since the K colorant is defective, the drop of K in pixel value 422 will be cross-color converted into counts of C, M, and Y. The number of counts assigned to C, M, and Y is determined, according to a non-linear relationship, from the local density of the defective colorant at pixel P2 404. The local density corresponds to the distance of pixel P2 404 from the closest pixel previously converted for the defective K colorant. This distance has a reciprocal relationship to the local density; a smaller distance reflects a higher density of pixels that have the defective colorant, while a larger distance reflects a lower density of pixels that have the defective colorant. In regions where the defective colorant has a higher local density, the number of counts of the replacement non-defective colorants may be greater in the cases of some colorants (e.g., K being replaced by CMY), or less in cases of other colorants (e.g., C being replaced by K). Similarly, in regions where the defective colorant has a lower local density, the number of counts of the replacement non-defective colorants may be less or greater.

The relationship of the pixel value of a defective colorant to the added counts for the non-defective colorant(s) is predetermined to provide human-vision-equivalence. The relationship may be established, for example, through trial-and-error using human observers to assess the image quality resulting from the color replacement. Once established, the relationship may be reflected in a set of formulas that, for each defective colorant, calculate the number of cross-colorant counts for the non-defective colorants based on the defective colorant and on the local density or pixel distance. Alternatively, the relationship may be reflected in a set of lookup tables that, for each defective colorant, specify the number of cross-colorant counts for the non-defective colorants based on the local density or pixel distance.

The relationship of the pixel value of a defective colorant to the added counts for the non-defective colorant(s) typically is non-linear. In addition, the relationship is non-integer. For example, where one drop of a defective colorant corresponds to 255 counts, the number of replacement cross-color counts for a non-defective colorant may be more or less than 255 counts.

In some examples, a cross-color drop-to-count conversion formula may be expressed as:

$$\text{Counts} = (N1/\text{Distance} + N2) * \text{Drops}$$

where N1 and N2 are constants, Distance is the distance from the subject pixel to the closest pixel previously converted for the defective colorant, and Drops is the number of drops of the defective colorant in the pixel value.

The non-linear and non-integer characteristics of the cross-color drop-to-count relationship may be appreciated with respect to example lookup tables. Each lookup table, with reference to FIG. 5, reflects a corresponding conversion formula.

Figure 5:
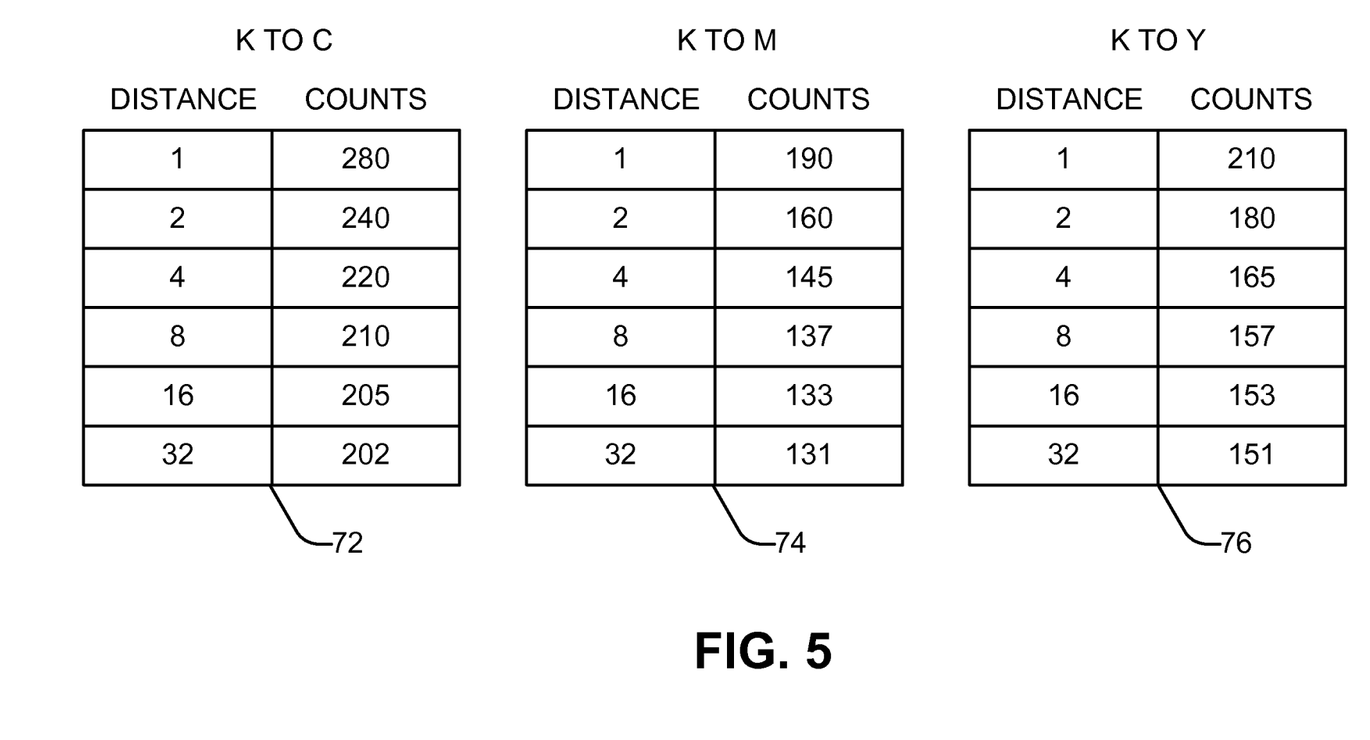
FIG. 5 is a schematic representation of example lookup tables for replacing a black colorant with cyan, magenta, and yellow colorants, in accordance with an embodiment of the present disclosure.

For K-to-C lookup table 72, N1=80 and N2=200.
For K-to-M lookup table 74, N1=60 and N2=130.
For K-to-Y lookup table 76, N1=60 and N2=150.

Interpolation or another technique can be used to determine the value of counts for distances not represented in the tables.

In other examples, different conversion formulas and/or different values of constants N1 and N2 for each color may be used.

Returning now to the processing of pixel P2 404, the total count value 450 (after re-halftoning) for pixel P1 402 is carried over to become the initial total count value 416 for pixel P2 404. This can be considered an error term that remains after the modified pixel value is calculated, and that is carried over to the next pixel. The distance 410 associated with pixel P2 404 maintains the same distance value 32 as the distance 408 for pixel P1 402, even though no K colorant was replaced for pixel P1 402. This occurs because a distance value of 32 corresponds to the lowest local density of concern; in other words, any distance larger than 32 would have substantially no effect on the number of replacement cross-color counts generated for the pixel. However if, for example, distance 408 would have been 5 instead of 32, then distance 410 for pixel P2 404 would have become a value of 6.

Pixel value 422 of pixel P2 404 specifies one drop of K colorant, and zero drops of C, M, and Y colorants. Since the K colorant is defective, counts of C, M, and Y colorants will be substituted for counts of K colorant, with the number of counts determined according to the proper conversion formula or one of the lookup tables 72-76.

Applying the K-to-C conversion formula yields a value of (80/32+200)*1=202 for the C colorant of cross-color replacement count 434.

Applying the K-to-M conversion formula yields a value of (60/32+130)*1=131 for the M colorant of cross-color replacement count 434.

Applying the K-to-Y conversion formula yields a value of (60/32+150)*1=151 for the Y colorant of cross-color replacement count 434.

It can be appreciated that the number of replacement counts for the non-defective colorants has a non-integer relationship to the number of drops of the defective colorant. For example, in the case of pixel P2 404, one drop of the defective K colorant has been replaced by $202/255^{th}$ of a drop of C colorant, $131/255^{th}$ of a drop of M colorant, and $151/255^{th}$ of a drop of Y colorant.

Adding each of the counts 434 to its corresponding initial total count 416 results in total count values 440 (before re-halftoning) of 329, 258, and 278 for the C, M, and Y components respectively. The re-halftoning operation evaluates each of the total count values 440 versus the threshold in order to convert counts back to drops for pixel P2 404 in a similar manner as was performed for pixel P1 402.

The total count value 440 for the C colorant equals 329, which exceeds the threshold value of 255. Therefore, the pixel value 446 is set to one drop for the C colorant. The threshold value of 255 is subtracted from the total count value 440 to produce the total count value 452 for the C colorant after re-halftoning of 74. Performing this operation for the M colorant results in one drop of M colorant in the pixel value 446, and a total count value 452 (after re-halftoning) for the M colorant of 3. Performing this operation for the Y colorant results in one drop of Y colorant in the pixel value 446, and a total count value 452 (after re-halftoning) for the Y colorant of 23. Thus, it can be observed that, based on the local density of the defective K colorant, one drop of the K colorant has been replaced by one drop of each of the non-defective C, M, and Y colorants and zero drops of the defective K colorant.

Considering now the processing of pixel P3 406, the total count value 452 (after re-halftoning) for pixel P2 404 is carried over to become the initial total count value 418 for pixel P2 406. The distance 412 associated with pixel 3 406 is set to a value of 1, since K colorant was cross-color replaced in the previous pixel, pixel P2 404.

Pixel value 424 of pixel P3 406 specifies one drop of K colorant and M colorant, and zero drops of C colorant and Y colorant. Since the M colorant is non-defective, the one drop of M colorant is converted to 255 counts of M colorant at 430. Since the K colorant is defective, counts of C, M, and Y colorants will be substituted for counts of K colorant, with the number of counts determined according to the proper conversion formula or one of the lookup tables 72-76.

Applying the K-to-C conversion formula yields a value of (80/1+200)*1=280 for the C colorant of cross-color replacement count 436.

Applying the K-to-M conversion formula yields a value of (60/1+130)*1=190 for the M colorant of cross-color replacement count 436.

Applying the K-to-Y conversion formula yields a value of (60/1+150)*1=210 for the Y colorant of cross-color replacement count 436.

It can be appreciated that, because of the local density of K colorant (i.e. the distance 412 since the last prior pixel in the raster for which the value of the defective K colorant was replaced), the cross-color replacement counts 436 for pixel P3 406 are considerably larger than the corresponding cross-color replacement counts 434 for pixel P2 404. This reflects the phenomenon that, in regions of higher density, larger amounts of the replacement colors produce human vision equivalence, while in regions of lower density, smaller amounts of the replacement colors produce human vision equivalence. Thus it can be appreciated that the replacement counts 434, 436 are determined based on the local density at the individual pixel of the colorant of the defective print element, and that the number of replacements counts 434, 436 has a non-linear relationship to the number of drops of defective colorant being replaced, based on the distance. In addition, the number of replacement counts for the non-defective colorants has a non-integer relationship to number of drops of the defective colorant. One drop of the defective K colorant has been replaced by $280/255^{th}$ of a drop of C colorant, $190/255^{th}$ of a drop of M colorant, and $210/255^{th}$ of a drop of Y colorant.

Adding the values for each of the colorants of the non-defective (same) counts 430 and defective (cross-color replaced) counts 436 to the values of the corresponding colorants of the initial total count 418 results in total count values 442 (before re-halftoning) of 354, 448, and 238 for the C, M, and Y components respectively. The re-halftoning operation evaluates each of the total count values 442 versus the threshold in order to convert counts back to drops for pixel P3 406 in a similar manner as was performed for pixel P1 402 and pixel P2 404.

The total count value 442 for the C colorant equals 354, which exceeds the threshold value of 255. Therefore, the pixel value 448 is set to one drop for the C colorant. The threshold value of 255 is subtracted from the total count value 442 to produce the total count value 454 for the C colorant after re-halftoning of 99. Performing this operation for the M colorant results in one drop of M colorant in the pixel value 448, and a total count value 454 (after re-halftoning) for the M colorant of 193. Performing this operation for the Y colorant results in zero drops of Y colorant in the pixel value 448, and a total count value 452 (after re-halftoning) for the Y colorant of 233. Thus, it can be observed that, based on the local density of the defective K colorant, one drop of the K and M colorants has been converted to one drop of the C and M colorants and zero drops of the defective K colorant and non-defective Y colorant. For the next pixel (not illustrated in FIG. 5), the total count value 454 (after re-halftoning) for pixel P3 406 will be carried over to become the initial total count value for the next pixel, and the distance associated with the next pixel will be set to a value of 1, since K colorant was cross-color replaced in pixel P3 406.

One consideration in the human vision equivalence of cross-color replacement is grain structure. As defined herein and in the appended claims, the term "grain structure" shall be broadly understood to mean the two-dimensional spatial relationship of color differences, as perceived by the unaided human eye, in the output that is produced by a system that uses discrete output color tones to reproduce a continuous tone input color. For example, the continuous tone input color could be a slightly cyan-ish gray, and the corresponding output could be a substantially uniform fill of gray with a sparse field of cyan dots. The sparse field of cyan dots represents the grain structure of the output. In another example, the continuous tone input color could be a very light color, and the corresponding output might be a sparse field of dots of the desired color on the unprinted background of a sheet of white print media. This latter example could have a raster of halftoned pixels which have a non-zero value for at least one colorant and other halftoned pixels which have a zero value for all colorants. Grain structure in a raster is analogous to the grain structure of the emulsion in a photographic film. The grain structure tends to be more perceptible by the human eye in a printed image in areas of sparse printing than in areas of dense printing, because fewer of the differently-colored dots are sparsely positioned within larger uniformly filled regions.

It is advantageous to maintain substantially the same grain structure in a modified raster that uses non-defective colorant(s) as exists in the original (unmodified) raster that uses the defective colorant. A modified raster with a grain structure that substantially matches that of the original raster will appear to the human eye to be more similar, when printed, to the intended appearance of the original raster than a modified raster with a different grain structure.

Figure 6:
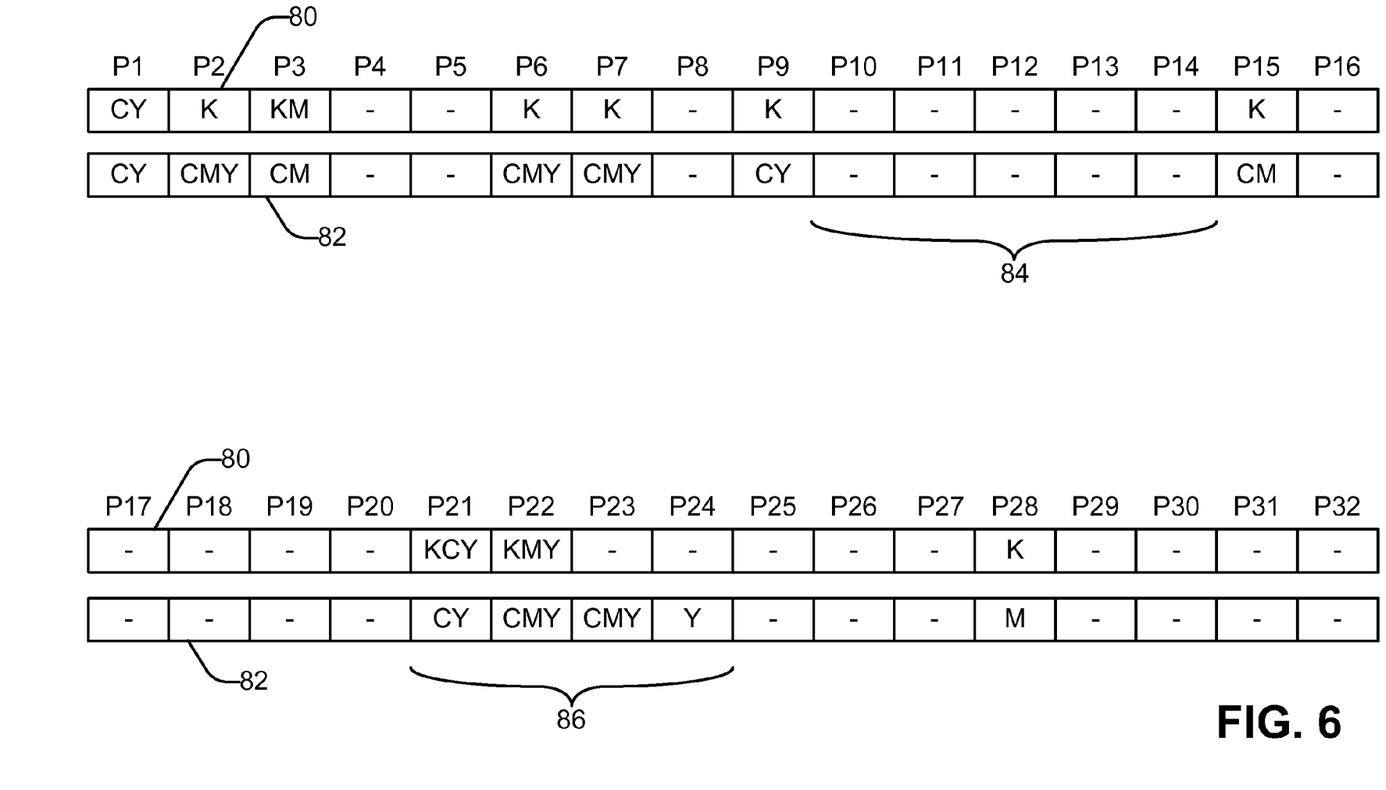
FIG. 6 is an example of a raster of image data that uses a defective colorant, and the modified raster generated by the system of FIG. 1, the method of FIG. 2, or the method of FIGS. 3A-B, in accordance with an embodiment of the present disclosure.

Consider now, and with reference to FIG. 6, an example of an original raster of halftoned image data that uses a defective colorant, and a corresponding modified raster. An example original raster 80 includes 32 pixels (numbered P1 through P32). Each pixel of the original raster 80 depicts the colorant drops specified by the pixel value (assume, for clarity of description, that each color represents one drop). For example, pixel P1 specifies a drop of C and Y colorants, and pixel P7 specifies a drop of K colorant. A "dash" as a pixel value depicts pixels for which no drops of any colorants are specified. For example, a region 84 represents "white space", where pixels P10 through P14, when the raster is printed, will produce an unprinted area.

A modified raster 82 is generated as has been described heretofore. The raster 82 replaces defective K colorant. For example, modified pixel P1 specifies a drop of C and Y colorants, and pixel P7 specifies a drop of C, M, and Y colorants. It is apparent from a comparison of the rasters 80, 82 that the grain structure is substantially the same in both rasters. The pixels of the modified raster 82 that have a non-zero value for at least one colorant are located at substantially the same pixel positions as the pixels of the original raster 80 that have a non-zero value for at least one colorant.

A difference can be observed at region 86. In the original raster 80, pixels P21 and P22 have non-zero values for colorants, while in the modified raster 82, pixels P21 through P24 have non-zero values for colorants. This may occur when an original pixel already specifies a non-zero value for a colorant which is also used as a replacement color. For example, pixel P21 in the original raster 80 specifies C and Y colorants, plus an amount of C and Y colorants will replace the defective K colorant. Since a maximum of one drop of C and Y can be specified in pixel P21 of the modified raster 82, if a second drop of either C or Y is merited by the re-halftoning, it will be pushed out to a subsequent pixel. A similar situation occurs with pixel P22. The outcome is that pixels P23 and P24 of the modified raster 82 also have non-zero values for at least one colorant, even though pixels P23 and P24 of the original raster 80 do not. However, it is apparent how the grain structure of the modified raster 82 is still substantially similar to that of the original raster 80. When the modified raster 82 is printed, it will result in a larger dot (also referred to as a "superpixel cluster") than would be produced for the original raster 80, but the placement of the larger dot would be substantially the same as the placement of the smaller corresponding dot. In other words, the structure of the grain is retained, and modified raster 82, when printed, will be perceived by the human eye as having human vision equivalence to the original raster 80. Using forward-only error diffusion as the re-halftoning technique maintains the grain structure.

From the foregoing it will be appreciated that the system and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of forming an image using a plurality of device-dependent colorants, comprising:
   receiving at least one raster of halftoned image pixels each having a discrete value for each of the colorants;
   for a raster associated with a defective colorant, modifying the values of the pixels to replace the defective colorant with an added amount of at least one non-defective colorant, the added amount for each individual pixel determined at least in part from a local density of the defective colorant at the corresponding pixel, the added amount having a predetermined non-linear relationship to the local density.

2. The method of claim 1, wherein the modifying includes sequentially modifying the values of each of the pixels, comprising:
   converting the value of each pixel that has a non-zero value for the defective colorant to a count for at least one of the non-defective colorants that is added to a total count for that non-defective colorant; and
   re-halftoning the total counts for the non-defective colorants to generate the new one of the N discrete values for the pixels.

3. The method of claim 1, wherein the local density of the defective colorant at a given pixel corresponds to a distance of the given pixel from a last prior pixel in the raster that had a non-zero value for the defective colorant prior to modification.

4. The method of claim 1, wherein the amount of the at least one non-defective colorant that replaces the defective colorant for a given pixel has a non-integer relationship to the value of the defective colorant associated with the given pixel.

5. The method of claim 1, wherein the received raster has a grain structure, and wherein the modified raster retains the grain structure.

6. A printing system for printing color image data using a plurality of colorants, comprising:

a plurality of print elements each configured to emit drops of one of the colorants to print halftoned pixels of a raster of the data, each pixel having a drop value for each of the colorants;

a detector to identify a defective one of the print elements;

a color replacer to modify the drop values of the pixels to replace the colorant of the defective print element with an added amount of colorant from at least one non-defective print element, the added amount determined for each individual pixel at least in part from a local density at the individual pixel of the colorant of the defective print element, the added amount having a predetermined non-linear relationship to the local density.

7. The printing system of claim 6, wherein the color replacer comprises:

a drop-to-count converter to convert the drop value of each pixel that has a non-zero value for the colorant of the defective print element to a count for at least one of the colorants of the non-defective print elements, and to add the count to a total count for that colorant; and a forward-only error-diffusion halftoner to halftone the total counts for the colorants of the non-defective print elements to generate the modified drop values for each pixel.

8. The printing system of claim 7, wherein the drop-to-count converter comprises:

a cross-color converter that converts a drop of a particular one of the colorants to a number of counts of at least one other one of the colorants based on a distance from a last replaced pixel, where the distance is a representation of the local density of the particular colorant.

9. The printing system of claim 6, wherein the raster has a grain structure, and wherein the raster retains the grain structure after modification of the drop values of the pixels by the color replacer.

10. A method of forming an image using a plurality of device-dependent colorants, comprising:

transforming a raster of halftoned image pixels each having one of N discrete values for each of the colorants to a human-vision-equivalent raster that replaces a defective one of the colorants by, for each pixel, converting the value for each non-defective colorant to a count, and adding the count to a total count for that non-defective colorant, converting the value for the defective colorant to a second count for at least one of the non-defective colorants, and adding the second count to the total count for that non-defective colorant, and re-halftoning the total counts of the non-defective colorants to generate a new value for the pixel.

11. The method of claim 10, wherein the second count is determined based on a local density of the defective colorant at a location of the pixel.

12. The method of claim 11, wherein the local density has a predetermined non-linear relationship to the count.

13. The method of claim 11, wherein the local density of the defective colorant corresponds to a distance of the pixel from a closest prior pixel in the raster for which the value of the defective colorant was previously converted.

14. The method of claim 11, wherein the second count has a non-integer relationship to the value for the defective colorant of the pixel.

15. The method of claim 10, wherein the new pixel value has one of the N discrete values for each of the non-defective colorants and a value of zero for the defective colorant.

16. The method of claim 10, wherein the set of locations in the raster of the transformed pixels having a non-zero value for at least one of the colorants is substantially the same as the set of locations in the raster of pixels having a non-zero value for at least one of the colorants prior to the transforming.

17. The method of claim 11, wherein the converting to a second count is not performed if the pixel value for the defective colorant is zero.

18. The method of claim 10, wherein the raster has a grain structure prior to the transforming, and wherein the transformed raster retains the grain structure.

19. The method of claim 10, wherein the re-halftoning is forward-only error diffusion.

20. The method of claim 10, wherein the image is formed using a printer and wherein each value represents a number of drops of the colorant to print the pixel, further comprising:

printing each pixel of the transformed raster on the printer by emitting the number of drops corresponding to the new value of each of the non-defective colorants of that pixel onto a print medium at a location corresponding to that pixel.

21. The method of claim 1, wherein the discrete value is selected from a first set of integer values, the first set smaller than a second set of integer values for non-halftoned image pixels.

22. The method of claim 21, wherein the first set of integer values comprises sixteen values or fewer.

* * * * *